(12) United States Patent
Remo

(10) Patent No.: US 11,904,631 B2
(45) Date of Patent: Feb. 20, 2024

(54) SEGMENTED WHEELS

(71) Applicant: Michael Remo, Clearwater, FL (US)

(72) Inventor: Michael Remo, Clearwater, FL (US)

( * ) Notice: Subject to any disclaimer, the term of this patent is extended or adjusted under 35 U.S.C. 154(b) by 110 days.

(21) Appl. No.: 17/406,996

(22) Filed: Aug. 19, 2021

(65) Prior Publication Data
US 2022/0055401 A1 Feb. 24, 2022

Related U.S. Application Data

(60) Provisional application No. 63/068,499, filed on Aug. 21, 2020.

(51) Int. Cl.
| | |
|---|---|
| *B60B 25/02* | (2006.01) |
| *B60B 9/04* | (2006.01) |
| *B60B 9/26* | (2006.01) |
| *B60C 7/08* | (2006.01) |
| *B60C 7/10* | (2006.01) |
| *B60C 7/24* | (2006.01) |

(52) U.S. Cl.
CPC ............... *B60B 25/02* (2013.01); *B60B 9/04* (2013.01); *B60B 9/26* (2013.01); *B60C 7/08* (2013.01); *B60C 7/1015* (2021.08); *B60C 7/24* (2013.01); *B60B 2900/541* (2013.01)

(58) Field of Classification Search
CPC .. B60B 25/02; B60B 9/04; B60B 9/26; B60C 7/1015; B60C 7/08; B60C 7/24
See application file for complete search history.

(56) References Cited

U.S. PATENT DOCUMENTS

| | | | | |
|---|---|---|---|---|
| 415,787 | A * | 11/1889 | Oliver ...................... | B60B 9/26 152/85 |
| 927,977 | A * | 7/1909 | Kelly ....................... | B60B 9/26 152/79 |
| 975,207 | A * | 11/1910 | Caldwell ............... | B60C 7/1015 152/313 |
| 1,059,009 | A * | 4/1913 | Strietelmeier ............ | B60B 9/26 152/79 |
| 1,198,302 | A * | 9/1916 | Williams .................. | B60B 9/26 152/76 |

(Continued)

FOREIGN PATENT DOCUMENTS

| | | |
|---|---|---|
| GB | 191103362 A * | 11/1911 |
| JP | 2005212675 A * | 8/2005 |

(Continued)

*Primary Examiner* — Kip T Kotter

(57) ABSTRACT

Segmented wheels offer advantages in storage space of closely packed segments as compared to whole wheels. Individually damaged or worn segments may be replaced in the field with little or no need for jacks or cranes to support the rest of the vehicle, and entire wheels may be replaced or reconfigured from one tread type to another by swapping out segments not in contact with the ground and then driving the vehicle a distance which is a fraction of the circumference of its wheels to expose the remaining segments for retrofit. Segments may be freely supported by rigid or compliant spokes or may be bound together by straps or designed to interlock with adjacent segments. Embodiments of the invention may be made in any size range including applications for bicycles, agricultural machinery, cars, trucks and mining machinery and vehicles.

19 Claims, 12 Drawing Sheets

(56) References Cited

U.S. PATENT DOCUMENTS

| | | | | |
|---|---|---|---|---|
| 1,345,912 | A | * | 7/1920 | Edling ...................... B60B 9/04 |
| | | | | 152/12 |
| 6,698,480 | B1 | | 3/2004 | Cornellier |
| 2012/0032497 | A1 | * | 2/2012 | Sheu ....................... B60B 1/041 |
| | | | | 301/55 |
| 2022/0332142 | A1 | * | 10/2022 | Animashaun ........... B60B 25/02 |

FOREIGN PATENT DOCUMENTS

| | | | | |
|---|---|---|---|---|
| WO | WO-9503183 A1 | * | 2/1995 | ............. B60B 25/02 |
| WO | WO-2015052989 A1 | * | 4/2015 | ............... B60B 9/04 |

\* cited by examiner

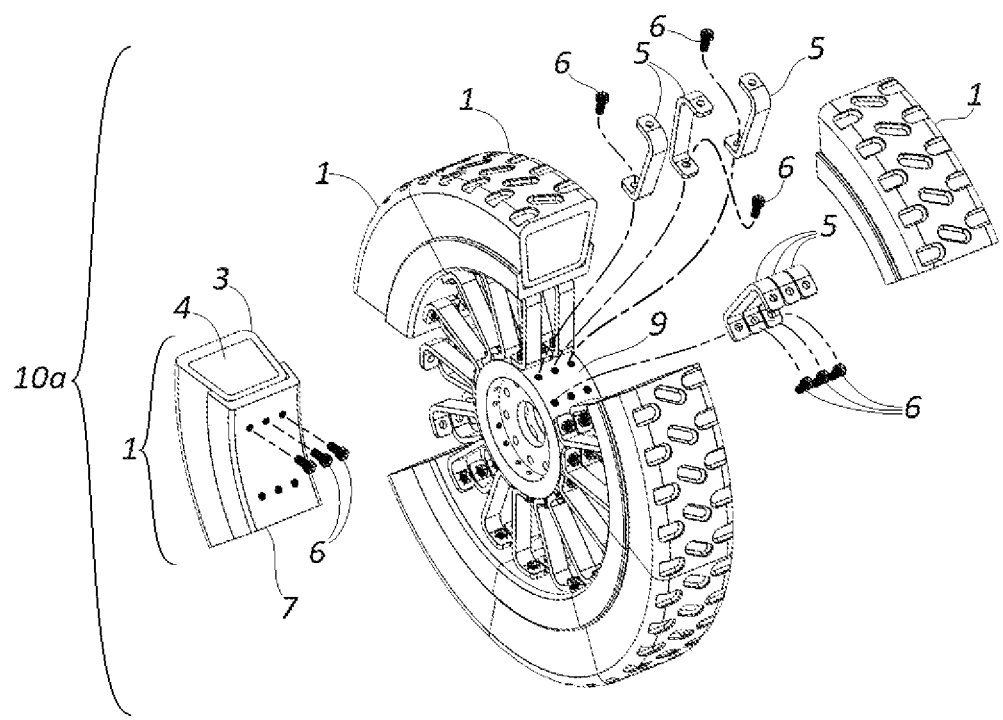
Fig. 3
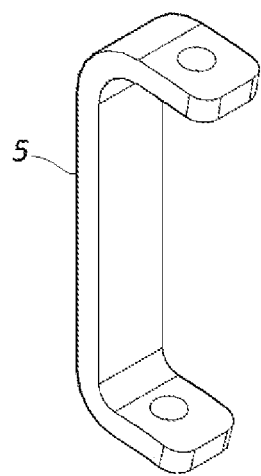 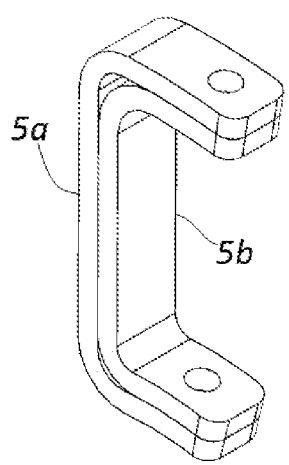 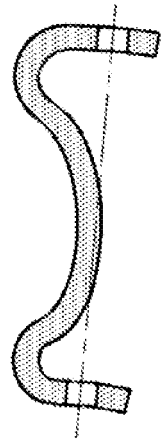 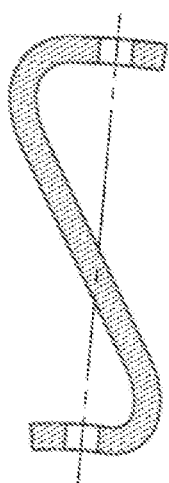
Fig. 4a    Fig. 4b    Fig. 4c    Fig. 4d

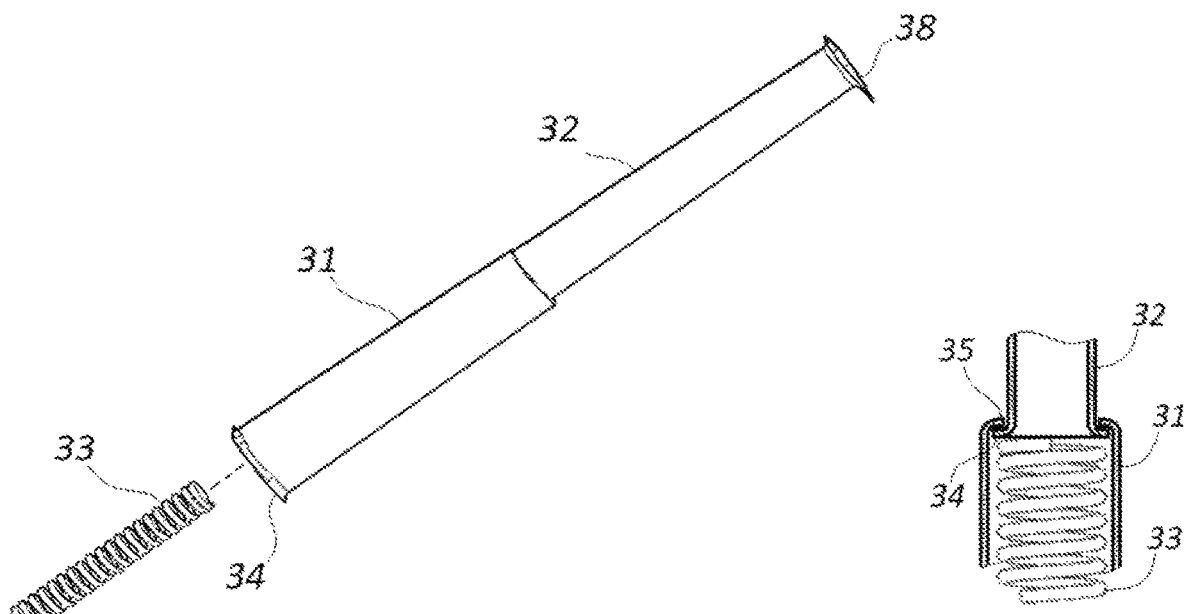
Fig. 11b
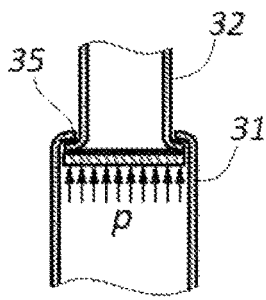
Fig. 11c
Fig. 11d
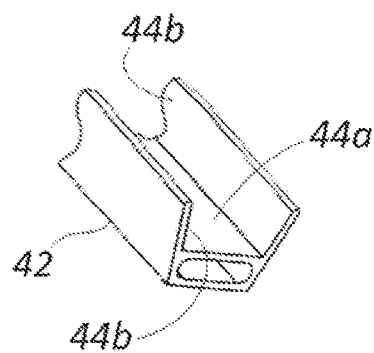
Fig. 11e
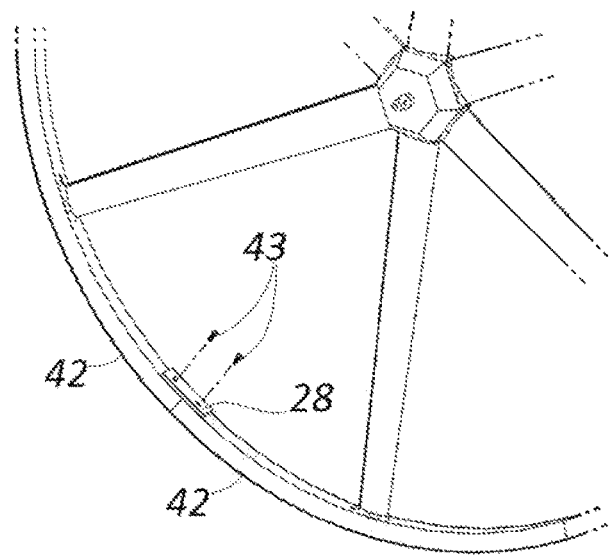
Fig. 12

SEGMENTED WHEELS

CROSS REFERENCE TO RELATED APPLICATION

This application claims the benefit of and priority to U.S. Provisional Application 63/068,499 "Segmented Wheels," filed 21 Aug. 2020. The entire contents of U.S. Provisional Application 63/068,499 "Segmented Wheels," filed 21 Aug. 2020, are hereby incorporated into this document by reference.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The invention relates to vehicle wheels constructed as individually replaceable segments.

BACKGROUND

Vehicle wheels, rims, and tires made as whole circles create storage inefficiencies because circles do not tesselate nearly as well as other nestable shapes. Wasted areas include the circular center of a hollow wheel and diamond or triangular areas between adjacent circumferences of whole wheels.

Besides general tread wear, acute damage to a tire or wheel sufficient to warrant replacement may occur at only one or a few points around its circumference, and yet the entire circular mass must be replaced.

For large wheels such as on large construction and mining vehicles and machinery a typical flat-bed trailer can only carry one or a few replacement wheels or tires at a time, and replacing such a wheel in the field requires large forces to support the axle while the wheel is being exchanged. These forces usually come from jacks or cranes which also must be transported to the repair site and are typically rented at substantial daily or hourly cost.

Bicycle wheels consume an enormous amount of space which makes transporting them by car inconvenient for the cyclist. Also, when cyclists bring full-sized wheels onto public transportation vehicles such as light rail passenger cars and busses, they delay other commuters while specialized machinery handles their bicycles and the space consumed by a full-sized bicycle on a light rail passenger car greatly inconveniences other riders.

BRIEF DESCRIPTION

A primary objective of the invention is to provide a wheel assembly made up of separable rim and tire segments which may be individually replaced. A corollary objective of the invention is to provide a selection of rim segments and rim and tire segments which may be exchanged as a vehicle moves from terrain in which a first configuration is preferable to other terrain in which a second configuration is preferable.

Another objective of the invention is to provide a wheel assembly in which spokes which connect a wheel segment to its hub may be exchanged so that a selection of spoke configurations having various mechanical compliances is available. A corollary objective of the invention to provide a variety of spoke configurations, including options in which more than one spoke attach from a single site on the hub to a single site on a rim segment, so that spoke configurations may be changed as a vehicle moves from terrain in which a first spoke configuration is preferable to other terrain in which a second spoke configuration is preferable.

Yet another objective of the invention is to reduce tire maintenance expenses and material waste by providing an opportunity to replace only damaged segments of a segmented wheel when local and acute damage occurs rather than having to replace an entire tire when damage has only occurred in one or a few locations while the rest of the tire remains usable.

A further objective of the invention is to reduce wasted storage space taken up by the interior circular volumes of tires and rims and by the somewhat diamond or triangular shaped volumes of space between adjacent tires or wheels.

Yet another objective of the invention is to provide means for connecting rim segments from one to the next or retaining an entire set as a unitary wheel. A corollary objective of the invention is to provide interlocking means for adjacent rim ends to grip together when assembled.

Another specific objective of the invention is to provide a space saving collapsible bicycle wheel so that cyclists may transport their bicycles in a compact state convenient for backpack or car trunk transport.

Another objective of the invention is to reduce or mitigate coupled vibration wherein resonant energies are exchanged between spoke segments having similar resonant frequencies, or residing within harmonic multiples of each other.

BRIEF DESCRIPTION OF THE DRAWINGS

A further understanding of the nature and advantages of particular embodiments may be realized by reference to the remaining portions of the specification and the drawings, in which like reference numerals are used to refer to similar components. When reference is made to a reference numeral without specification to an existing sub-label, it is intended to refer to all such multiple similar components.

FIG. 2b shows a front top right oblique view of the embodiment shown in FIG. 2a.

FIG. 3 shows the embodiment of FIG. 2a with the components of some of the wheel segments exploded for further discussion.

FIG. 4a shows an embodiment of a detachable, replaceable spoke for a rim subassembly of a segmented wheel in accordance with the invention.

FIG. 4b shows an embodiment of a nested set of spokes for a rim subassembly of a segmented wheel in accordance with the invention.

FIG. 4c shows a cross section of a compliant spoke for a rim subassembly of a segmented wheel in accordance with the invention.

FIG. 4d shows a cross section of an alternate form of a compliant spoke in accordance with the invention.

FIG. 11b shows an embodiment of a compliant spoke in accordance with the invention, with the spoke comprising telescoping elements.

FIG. 11c shows a cross section of a portion of the compliant spoke of FIG. 11b.

FIG. 11d shows a cross section of an alternate embodiment of a compliant spoke in accordance with the invention.

FIG. 11e shows a portion of an embodiment of a rim segment in accordance with the invention, and its features.

FIG. 12 shows a portion of an alternate embodiment of a segmented wheel in accordance with the invention similar to that shown in FIG. 11a but with adjacent rim segments attached together by straps.

DETAILED DESCRIPTION OF CERTAIN EMBODIMENTS

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

In this application the use of the singular includes the plural unless specifically stated otherwise, and use of the terms "and" and "or" is equivalent to "and/or," also referred to as "non-exclusive or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

The invention relates to segmented wheels, which offer advantages in storage space because closely packed segments take up less volume than do whole wheels or tires. Individually damaged or worn segments of a wheel may be replaced in the field with little or no need for jacks or cranes to support the rest of the vehicle, and entire wheels may be replaced or reconfigured from one tread type to another by swapping out segments not in contact with the ground and then driving the vehicle to a distance of a fraction of the circumference of its wheels to expose the remaining segments for retrofit. Segments may be freely supported by rigid or compliant spokes or may be bound together by straps or designed to interlock with adjacent segments. Embodiments of the invention may be made in any size range including sizes for bicycles, agricultural machinery, cars, trucks and mining machinery and vehicles.

Figure 1A:
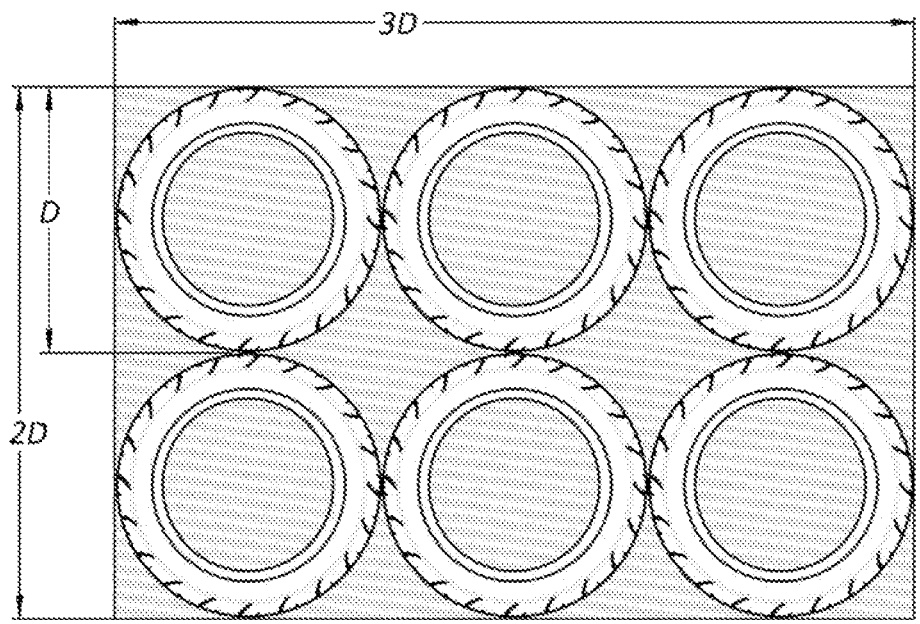
FIG. 1a illustrates an area taken up by a set of six conventional tires or wheels.

Referring to the figures, FIG. 1a illustrates an area taken up by a set of six conventional tires or wheels having an external diameter "D." The difference between inner and outer diameter of the wheel is chosen arbitrarily for this example. The hatched areas inside and outside of the wheels represent wasted space, and because of their rounded edges it is difficult to cluster boxes, packages, or regular arrangements of other objects efficiently within those residual volumes. Storing whole wheels or tires invariably results in unusable voids.

Figure 1B:
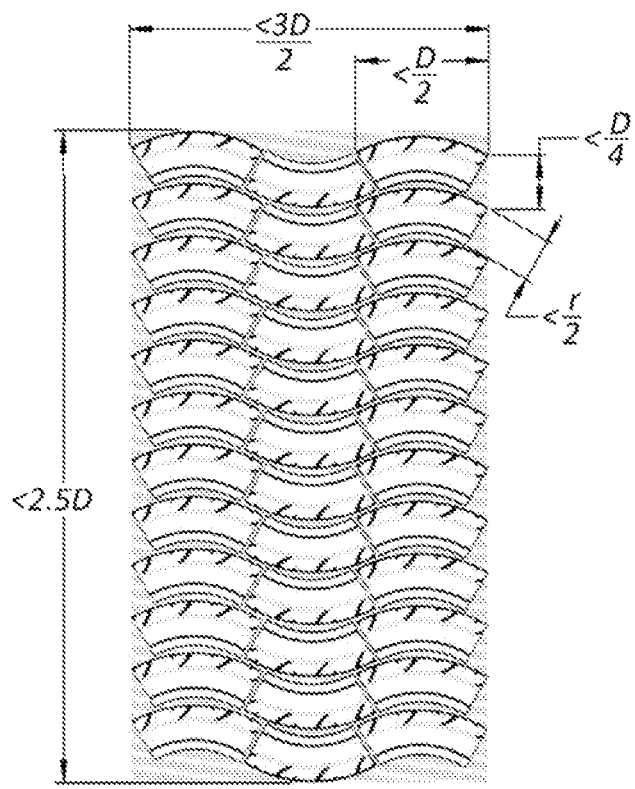
FIG. 1b shows a much reduced area consumed by the same tires when segmented into 60° sections.

It is straightforwardly understood that six wheels in a 2D×3D array consume $6D^2$ of unit area. But by cutting the wheel into 60° sections and nesting the sections as shown in FIG. 1b, the area consumed by the same wheels when is substantially reduced. If the wheel outer radius is "r," and the sectional thickness of the wheel is less than half the radius, or <r/2, then the maximum width of the wheel section is also r or D/2 because six line segments each of one radius in length may be exactly arranged to form a hexagon fitting around the circumference of a circle.

Nesting the segments in alternating oppositely facing rows as shown in FIG. 1b, a rough measurement of the resulting minimum rectangle finds it no larger than 2.5D× 3/2D which is $3.75D^2$ of unit area. This represents an area reduction of at least 37% and a substantial reduction in unusable void space between the stored articles.

Figure 2A:
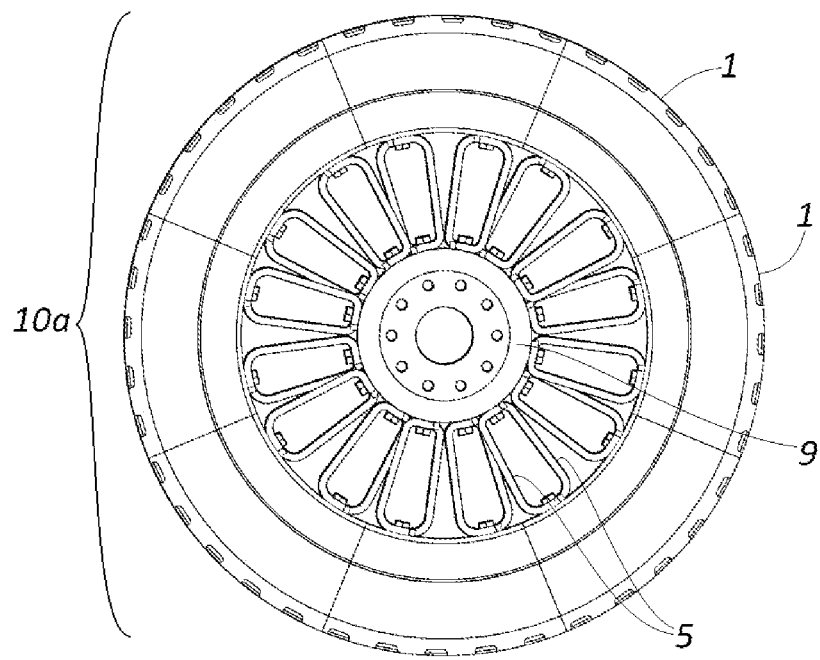
FIG. 2a shows a front view of an embodiment of a segmented wheel in accordance with the invention.
Figure 2B:
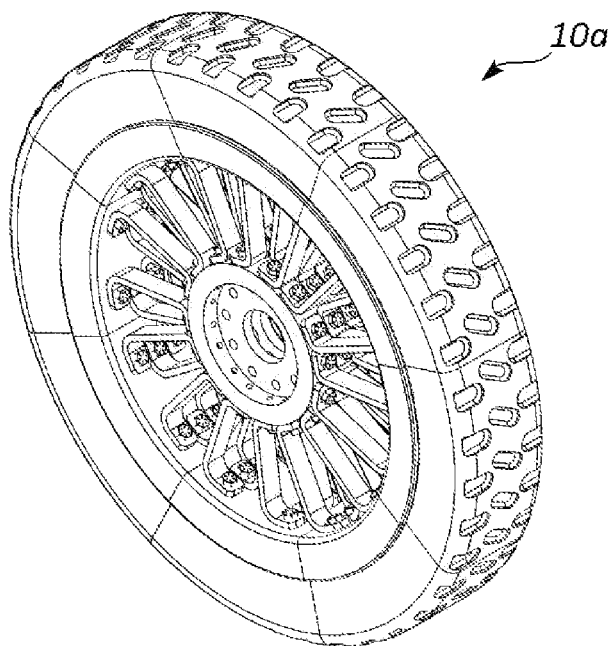

FIG. 2a shows a front view of an embodiment of a segmented wheel [10a] in accordance with the invention. Although the examples shown in the figures illustrate systems built up of six 600 sectors or eight 45° degree sectors, it is understood that other systems comprising integer numbers of substantially identical and fungible wheel segment subassemblies may be designed and built, such as 4 segments of 90° sectors, 5 segments of 72° sectors, 10 segments of 36° or other systems using 7, 12, or other prime or non-prime integers. The wheel segment [1] subassembly in this embodiment comprises a rim segment and a tire segment attached to a hub [9] by at least one spoke [5] and preferably a plurality of spokes between each wheel segment and the hub. FIG. 2a shows a front top right oblique view of the segmented wheel [10a] shown in FIG. 2a.

FIG. 3 shows the embodiment of FIG. 2a with the components of some of the wheel segments exploded for further discussion. Each wheel segment [1] subassembly comprises a rim segment [7] and a tire segment [3] which in this embodiment includes an exterior sheath including a tread pattern and an interior core [4.] The tire segment is received within the rim segment and further comprises a tread pattern. Although it is preferable to construct the outer sheath from durable material such as vulcanized rubber, or a polymer or elastomer having a Shore D durometer between 45D and 75D, it may also be preferable to construct rigid core segments surrounded by a softer material such as Shore 45A to 75A, or pneumatic segments of automotive rubber having a pressurized cavity of air, or constructed with a "run flat" interior core of foam or cancellous material. A wheel segment may also comprise a treaded component bonded to a rigid rim component.

Each wheel segment is attached to spokes [5] using fasteners [6] such as bolts. Where spokes are not radially symmetrical it may be preferable to orient them oppositely in their radial arrays. The spokes attach the wheel segments to a hub [9] which includes a plurality of attachment sites for the spokes so that within a plurality of spokes, first and second spokes are individually attached between the rim or wheel segment and the hub. The compliance of the system may be adjusted by altering the number and locations of the spokes connecting each wheel segment to the hub.

FIG. 4a shows an embodiment of a detachable, replaceable spoke [5] for a rim subassembly of a segmented wheel in accordance with the invention. FIG. 4b shows an embodiment of a nested set of spokes [5a, 5b] for a rim subassembly of a segmented wheel in accordance with the invention. Embodiments of spokes include a first attachment site usually for fixing the spoke to the hub, and a second attachment site for attaching the spoke to a wheel segment or a rim segment.

When spokes are nested, they each share fasteners at their attachment sites which attach them to the hub and also share fasteners which attach them to the rim or wheel segment, so that they flex in concert and act like parallel springs. The compliance of a segmented wheel system may be adjusted by adding or removing successively nested sets of spokes. Although only two nested spokes are shown in the figure it is within the scope of the invention to arrange any number of spokes in a nested assembly especially if they are formed from strip material such as a plurality of strips which comprise a leaf spring suspension. Rolled material may be of any tempered condition such as annealed, partially annealed, hardened, mill hardened, or spring hardened depending on the tensile strengths required to support the service load.

FIG. 4c shows a cross section of a spoke for a rim subassembly of a segmented wheel in accordance with the invention which has a compliant section. This shape may be called a "sigma" spoke because of its resemblance to the Greek letter Z. FIG. 4d shows a cross section of an alternate form of a compliant spoke in accordance with the invention. This shape may be called a "Z" spoke.

Figure 4E:
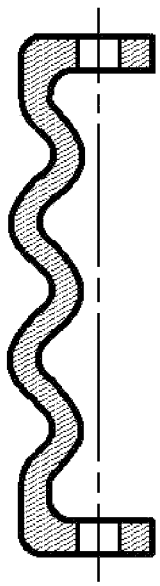
FIG. 4e shows a cross section of another alternate form of a compliant spoke in accordance with the invention.
Figure 4F:
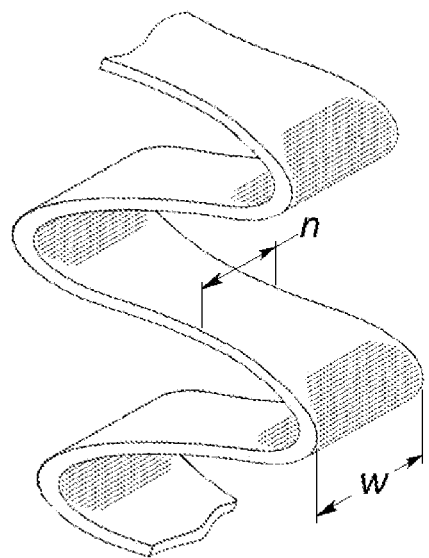
FIG. 4f shows a portion of yet another alternate embodiment of a compliant spoke in which material width is varied to even out bending stresses throughout the compliant section.

FIG. 4e shows a cross section of another alternate form of spoke with a compliant section in accordance with the invention. This spoke design includes an undulated or corrugated portion which is vertically compliant. FIG. 4f shows a portion of yet another alternate embodiment of a compliant section of a spoke in which material width is varied to even out bending stresses throughout the compliant section. Acute bends in materials accumulate stress concentration factors, which may be addressed deploying increased material width "w" through those portions while narrowing the strip width to a narrower width "n" in the flat or less acutely curved sections. Finite element analyses (FEA) may be used in selecting "w" and "n" to compress the range of the maximum principal stresses found in the corners and the lower principal stresses at the central inflected areas where one curve ends and the next, oppositely formed curve begins. Most of the stress in these central sections will be shear stress.

Figure 4G:
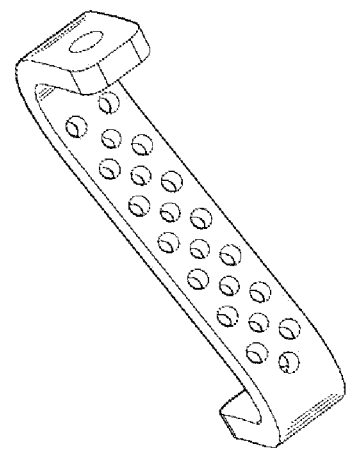
FIG. 4g shows an embodiment of a perforated spoke for a rim subassembly of a segmented wheel in accordance with the invention.
Figure 4H:
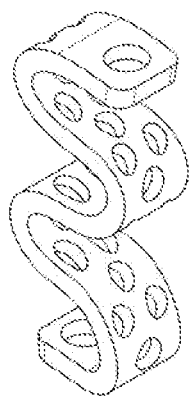
FIG. 4h shows an embodiment of a compliant, perforated spoke for a rim subassembly of a segmented wheel in accordance with the invention.

FIG. 4g shows an embodiment of a perforated spoke for a rim subassembly of a segmented wheel in accordance with the invention, and FIG. 4h shows an embodiment of a compliant, perforated spoke for a rim subassembly of a segmented wheel in accordance with the invention. Where the material is not pre-punched, judicious selection and variation of hole diameters, locations, and proximity of each hole to another or to the material edge, may be used in conjunction with FEA to even out the stress throughout the convoluted compliant section. Putting compliant material to work evenly along its working length extends service life and uses expensive materials more efficiently.

Figure 5:
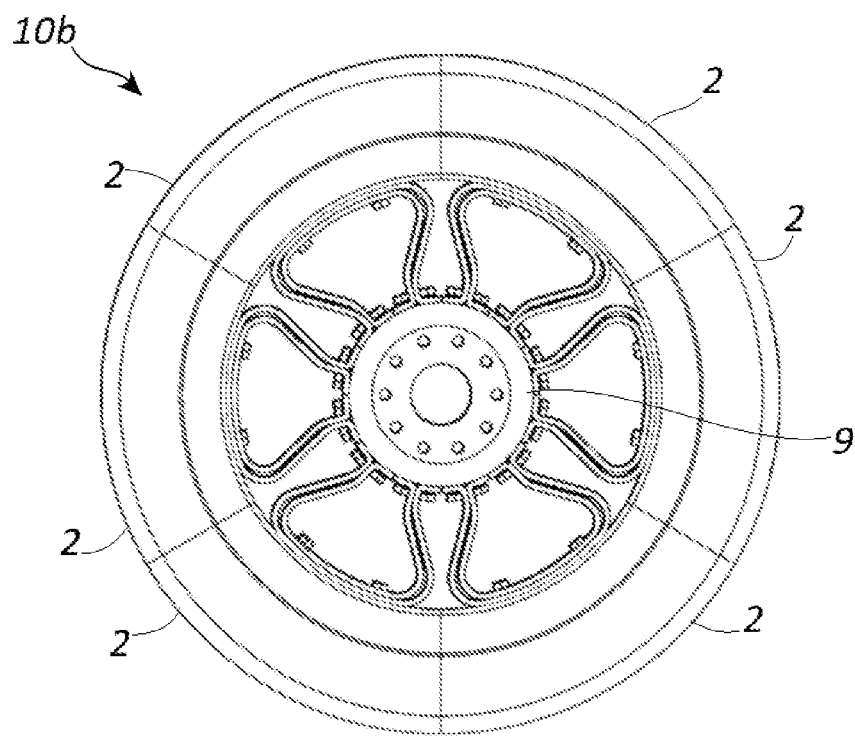
FIG. 5 shows a front view of another embodiment of a segmented wheel in accordance with the invention which comprises nested sets of "omega" spokes.

FIG. 5 shows a front view of another embodiment of a segmented wheel [10b] in accordance with the invention which comprises nested sets of "omega" spokes. Each wheel segment [2] attaches to the hub [9] on a plurality of compliant spokes which will be described in further detail.

Figure 6:
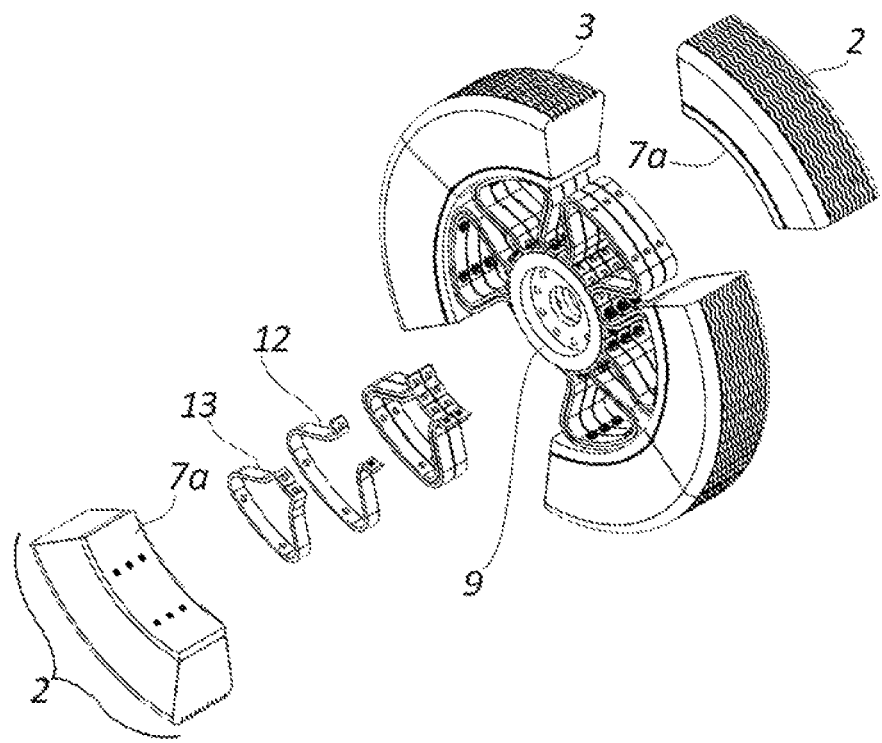
FIG. 6 shows a front top right view of the embodiment of FIG. 5, with the components of some of the wheel segment components exploded for further discussion.

FIG. 6 shows a front top right view of the embodiment of FIG. 5, with the components of some of the wheel segment components exploded for further discussion. Each wheel segment [2] comprises a rim segment [7] and a tire segment affixed to or within it. The tire [3] may be a solid material as shown, or may have a hollow cavity containing air or a fluid for pneumatic suspension, or may have a central core of another material such as cancellous elastomer, or closed cell foam. According to one class of embodiments the tire is made of a first firm or rigid material and the core is a second material of a softer elastomer, and according to another class of embodiments the outer tire is a first soft or vibration damping material and the inner core is a second material of a more durable, wear resistant sort such as vulcanized rubber.

The wheel segment is attached to the hub by at least one, but preferably sets of spokes. Attachment sites on the hub may be a first set of threaded apertures and attachment sites on the wheel segments may be a second plurality of threaded apertures. These apertures are preferably arranged in regular arrays so that wheel segments are interchangeable among any position around the wheel or fungible between units designed for various service classes. In the embodiment shown, the spokes are "omega" spokes which include a central arcuate portion in contact with an inner surface of the rim or wheel segment, which is also a surface facing the hub. Extending from both ends of the central arcuate portion are two descending leg portions which may be straight, substantially straight, arcuate, sigmoidal, or corrugated as seen for the spoke shown in FIG. 4e. An omega spoke may also be a strip of varying width, and may also be perforated as seen in FIGS. 4g and 4h. The ends of the descending legs include end flanges which may be inward facing or outward facing. Although it is possible to nest more than one omega spoke having outward facing flanges or to nest more than one omega spoke having inward facing flanges, it is more preferred that nested omega spokes comprise a set of two spokes, one whose central arcuate portion and descending legs are formed to fit closely within the other, and with the first or outer omega spoke [12] having its flanges bent outward, and with the second or inner omega spoke [13] having its end flanges bent inward. With this configuration, all four end flanges of the set of two spokes affix directly to the hub [9,] and any inner or outer omega spoke may be replaced or exchanged independently of any other.

Figure 7A:
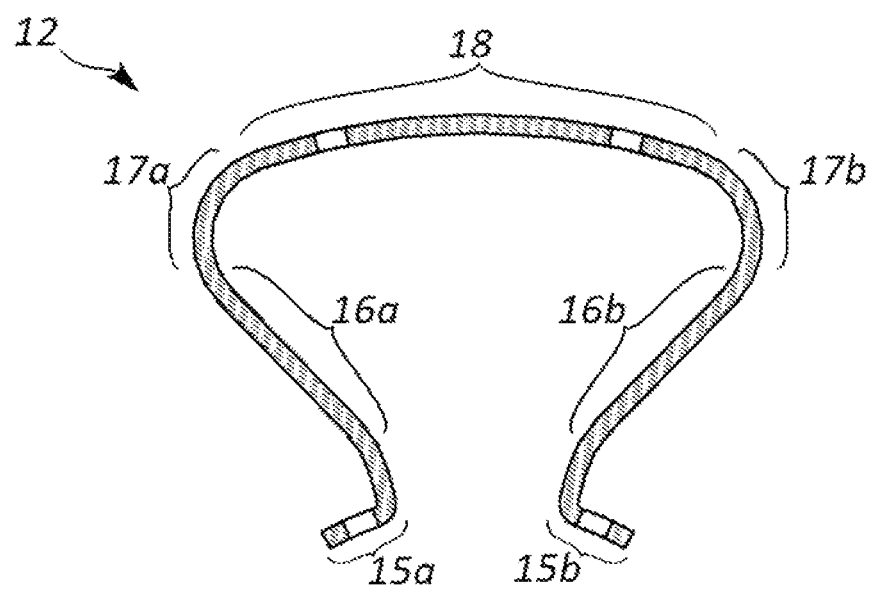
FIG. 7a shows a cross section view of an embodiment of a nestable omega spoke accordance with the invention.

FIG. 7a shows a cross section view of an embodiment of a nestable omega spoke [12] accordance with the invention. This omega spoke has a central arcuate portion [18] which affixes to an inner surface of a wheel segment, and compliant curved portions which continue from a first and a second end of its central arcuate portion. The first compliant curved portion [17a] continues to a first descending leg [16a] and then to a first end flange [15a] which bends outward from the omega arch of the central arcuate portion and its compliant curved ends. The second compliant curved portion [17b] continues to a second descending leg [16b] and then to a second end flange [15b] which bends outward from the omega arch.

Figure 7B:
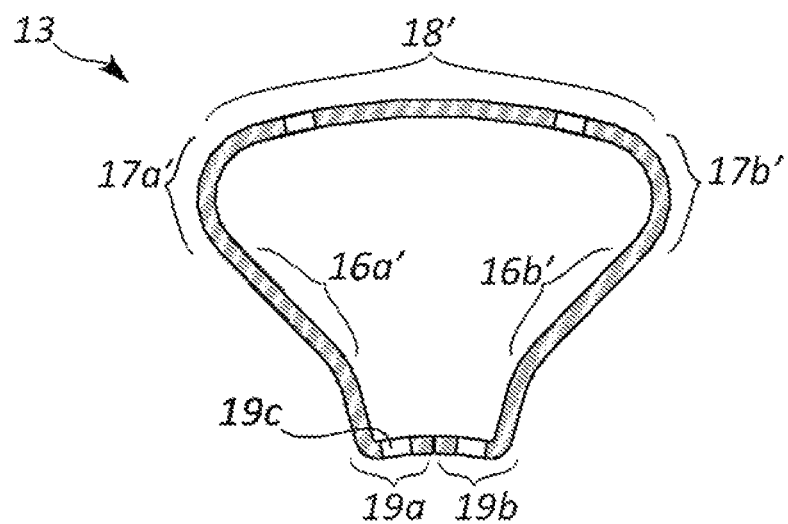
FIG. 7b shows a cross section view of another embodiment of a nestable omega spoke accordance with the invention.

FIG. 7b shows a cross section view of another embodiment of a nestable omega spoke accordance with the invention, which is formed to reside within the omega spoke of FIG. 7a so that the two may act in concert as a parallel spring suspension between the wheel segment and the hub. This omega spoke also has a central arcuate portion [18'] which affixes to an inner surface of the omega spoke of FIG. 7a, and compliant curved portions which continue from first and second ends of its central arcuate portion. The first compliant curved portion [17a'] continues to a first descending leg [16a'] and then to a first end flange [19a] which bends inward from the omega arch of the central arcuate portion and its compliant curved ends. The second compliant curved portion [17b'] continues to a second descending leg [16b']

and then to a second end flange [19b] which bends inward from the omega arch. The flange may be perforated by holes [19c] as an attachment site.

Figure 8:
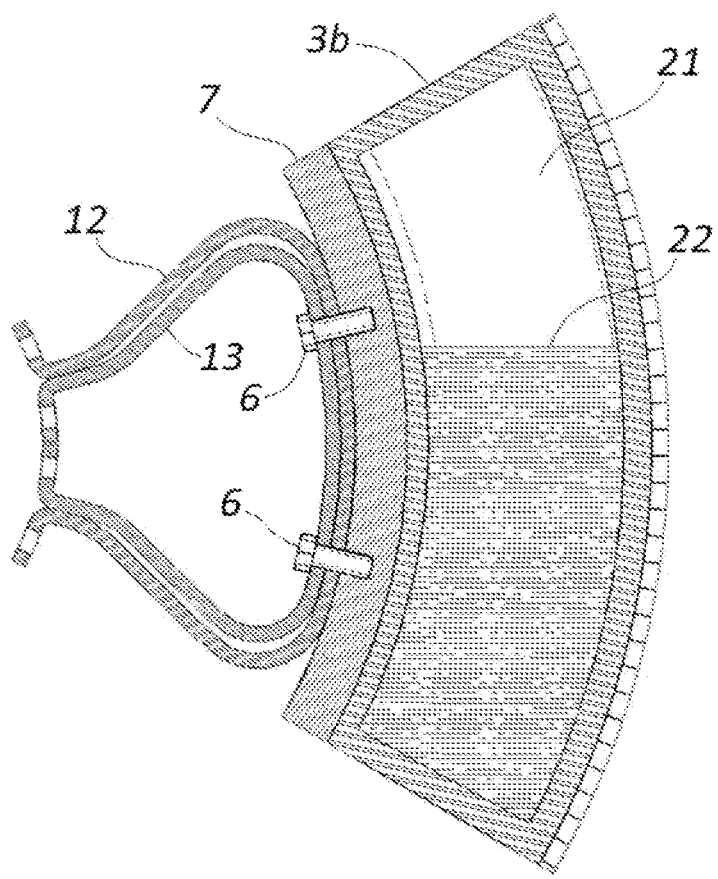
FIG. 8 shows a cross section view of a wheel segment subassembly in accordance with the invention which includes a pneumatic tire component having a fluid-filled cavity.

FIG. 8 shows a cross section view of a wheel segment subassembly in accordance with the invention which includes a pneumatic tire component [3b] having a cavity [21] containing a fluid [22.] Nested omega spokes [12] and [13] as described in FIGS. 7a and 7b attach to the rim segment [7] with fasteners [6.] The flanges of the omega spokes include apertures for other fasteners to affix them to the hub. It is seen that with the fasteners removed, individual omega spokes may be removed or exchanged while the other remains fastened to the hub. With nested omega spokes having flanges that all face outwardly or inwardly, one must remove all the fasteners for all spokes at that site on order to free any one spoke. In the preferable arrangement shown, one omega spring may be exchanged while the other remains in place as a safety support to prevent or reduce the chance of the loosened wheel segment falling into the workspace between it and the hub. This tire includes a cavity filled with a fluid which may preferably be a dense fluid such as calcium chloride. The additional weight of the dense fluid aids traction when the wheel is mounted on a drive axle of a vehicle and may be used to add weight, traction, and improved steering control to the lighter front end of a vehicle such as a rear engine, rear wheel drive vehicle with front axle steering.

Figure 9A:
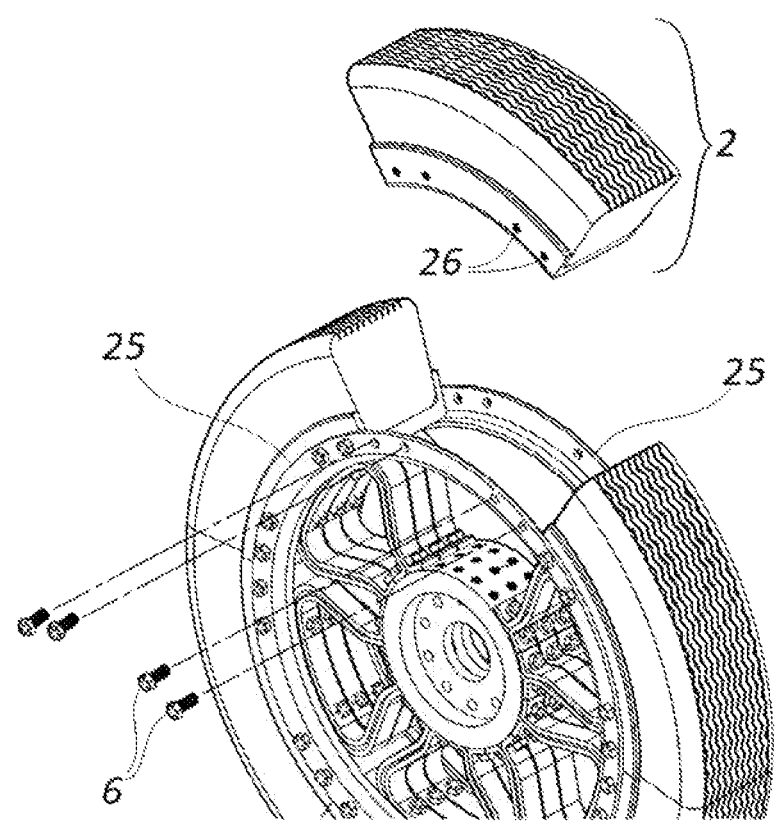
FIG. 9a shows an oblique view of a portion of another embodiment of a segmented wheel in accordance with the invention with one wheel segment displaced to reveal hoops to which the wheel segments are connected.

FIG. 9a shows an oblique view of a portion of another embodiment of a segmented wheel in accordance with the invention with one of the wheel segments [2] displaced to reveal hoops [25] to which the wheel segments are connected. The wheel segments include threaded apertures [26] which receive threaded fasteners [6] so that when completely assembled the hoops stabilize the entire set of wheel segments into a unitary whole.

Figure 9B:
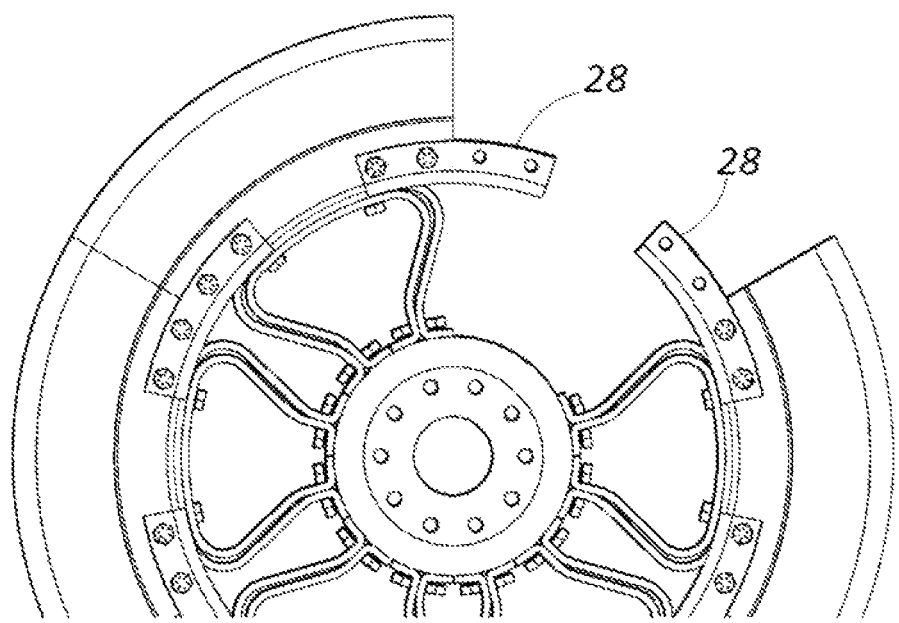
FIG. 9b shows a front view of a portion of another embodiment of a segmented wheel in accordance with the invention similar to that shown in FIG. 9a but with adjacent segments attached together by straps.

FIG. 9b shows a front view of a portion of another embodiment of a segmented wheel in accordance with the invention similar to that shown in FIG. 9a but with adjacent segments attached together by straps [28.] It is also seen in this figure that when a wheel segment subassembly is removed, then except for the hub no component or radial series of components remains which comprises a contiguous circle concentric with the hub.

Figure 10:
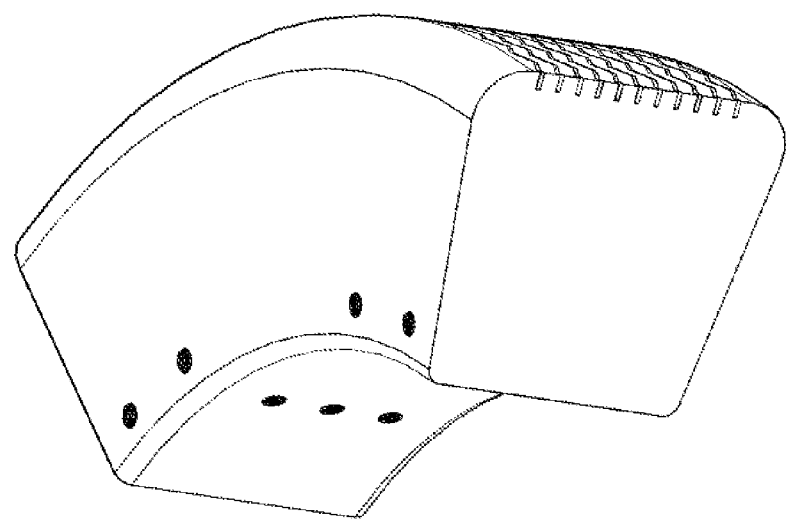
FIG. 10 shows an embodiment of a wheel segment which is a solid, treaded element.

FIG. 10 shows an embodiment of a wheel segment section which is a solid, treaded element. Wheel segments such as these may be furnished with varying tread designs so that a vehicle may be converted from a highway or street use mode having finer treads such as [3a] of FIG. 6 to an aggressive, high-traction off-road mode by swapping the road-use wheel segments such as [2] of FIG. 6 with wide-lug designs such as [1] of FIG. 3 and softer elastomeric material or other designs for application specific operations. The wheel segment includes apertures for affixing to a spoke and one or more hoops or connecting straps. In this embodiment the threaded apertures on the inward facing curved surface of the rim define an attachment site for a spoke.

Figure 11A:
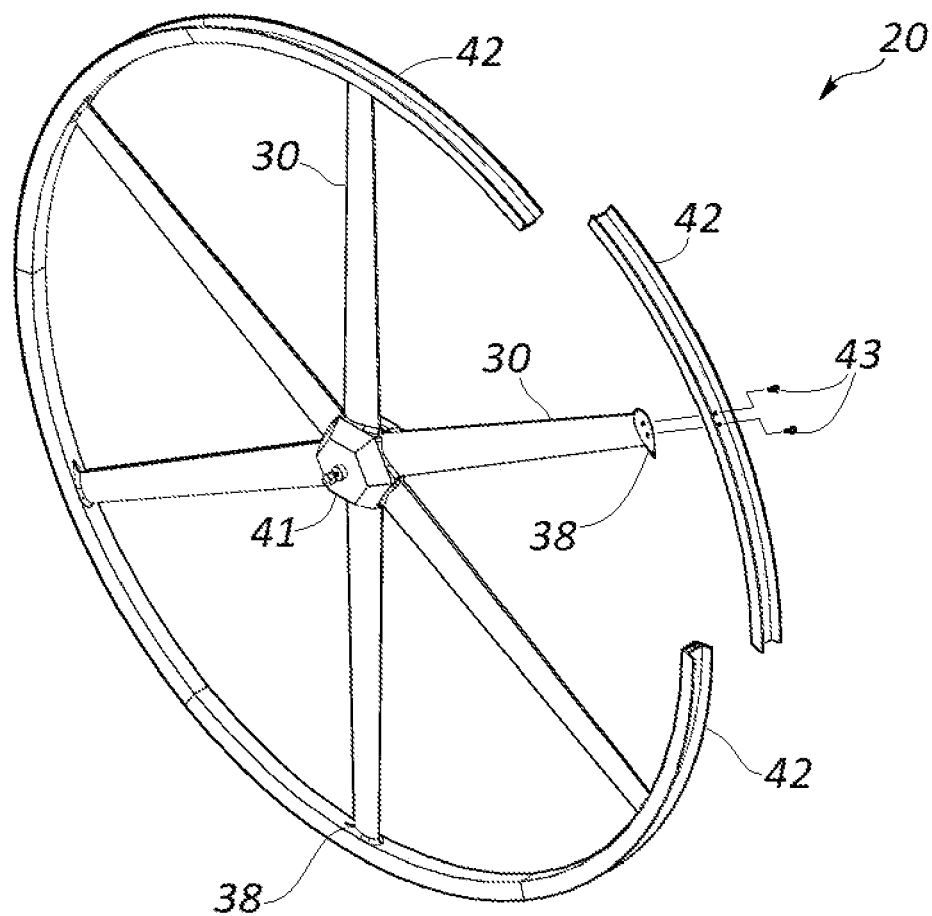
FIG. 11a shows a front top right view of another embodiment of a segmented wheel in accordance with the invention and with one of its rim segments exploded from its spoke.

FIG. 11a shows a front top right view of another embodiment of a segmented wheel [20] in accordance with the invention, with one of its rim segments exploded from its spoke. As a complete assembly this embodiment operates like a clincher rim for bicycles. Typical spoked bicycle wheels consume enormous amounts of space and bicyclists could benefit from a collapsible wheel allowing them to transport their vehicle in a more compact state such as in a backpack or automobile trunk. Also, by not having to use the cumbersome and time-consuming bike carrier contraption on a bus, a bicyclist carrying a bicycle collapsed into a reasonable carry-on bag or backpack aboard public transportation may board normally, consume less on-board space, and be generally far less inconveniencing to the other riders.

As segmented, collapsible bicycle wheel in accordance with the invention includes a hub [41,] rim segments [42,] and spokes [30.] The spoke ends are formed to conform to the inner curved surface of the spokes and may include a tip fairing [38] providing an improved mating surface for the rim. The rims are affixed to the spoke ends by fasteners [43] which pass through apertures in the rim segment. In this embodiment the threaded apertures in the rim segment define an attachment site for the spoke.

FIG. 11b shows an embodiment of a compliant spoke in accordance with the invention, with the spoke comprising telescoping elements. Telescoping spokes save space when collapsed and usually comprise two or more hollow beams having similar cross sections, each progressively smaller than the last, so that the whole may be telescoped to the length of the longest element in a nested configuration. Although any number of nestable telescoping elements may be used, the figure shows two, an outer spoke element [31] and an inner spoke element [32.] In an alternative embodiment a compressible element such as a mechanical spring [33] may be disposed within one of the larger spoke elements so that the spoke assembly is a compliant spoke which acts as a suspension system for its rim segment.

FIG. 11c shows a cross section of a portion of the compliant spoke of FIG. 11b. The smaller spoke element [32] slides within the larger spoke element [31.] The larger spoke element includes an inwardly turned flange [35] leaving an end orifice for the smaller spoke element to slide through. The end of the smaller spoke element which resides within the larger includes an outwardly turned flange [34] so that the spokes may be axially pulled apart and stop at a desired extended length limited by the flange of the inner spoke element being unable to be pulled free from the larger spoke element. A compression spring [33] of the alternate embodiment may also be included and its size selected to push upon the flange of the inner spoke element so that the spoke assembly may function as a suspension system for its rim segment.

FIG. 11d shows a cross section of another alternate embodiment of a compliant spoke in accordance with the invention. The nestable telescoping larger spoke element [31] and smaller spoke element [32] are interlocked as described in the previous figure, but instead of a mechanical spring, the compressible element is a gas or fluid compressed to a pressure "p." The fluid may act as a compression element or as a mechanical dampening element depending on its viscosity. Nitrogen or argon may be selected as permanently filled compressed working fluids, or a nipple may be provided in the hub or in a spoke element so that while assembling the wheel a user with a bicycle pump may add compressed air to a preferred pressure for a desired level of ride comfort or road feel.

FIG. 11e shows a portion of an embodiment of a rim segment [42] in accordance with the invention, and its features. In this and in other embodiments such as a rim segment which receives a tire segment, the rim segment has a radially outward facing surface [44a] disposed between two axially inward facing flanges [44b.]

FIG. 12 shows a portion of an alternate embodiment of a segmented wheel in accordance with the invention similar to that shown in FIG. 11a but with adjacent rim segments [42] attached together by straps [28.] In this embodiment the straps and rim segments include apertures for receiving fasteners [43] which secure these components together.

Figure 13:
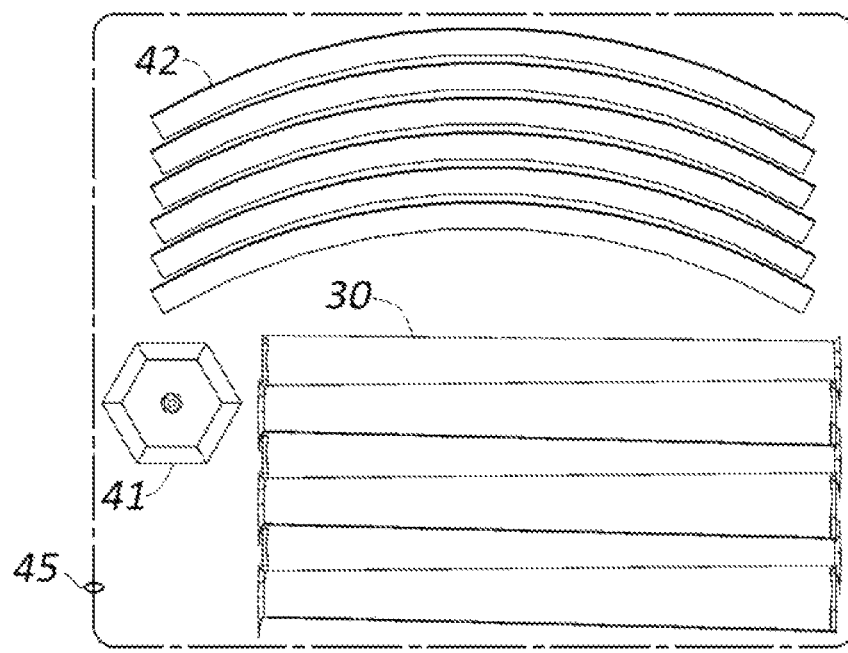
FIG. 13 shows the disassembled components of the segmented wheel of FIG. 11a arranged in a compact, space saving arrangement.

FIG. 13 shows the disassembled components of the segmented bicycle wheel of FIG. 11a arranged in a compact, space saving arrangement. By inspection it of the figure it is readily apparent that a pouch or sac [45] may be designed which would carry a typical 28-inch diameter bicycle wheel rim and a set of spokes in a much more compact space than a 28-inch diameter circle common for bicycles.

Figure 14:
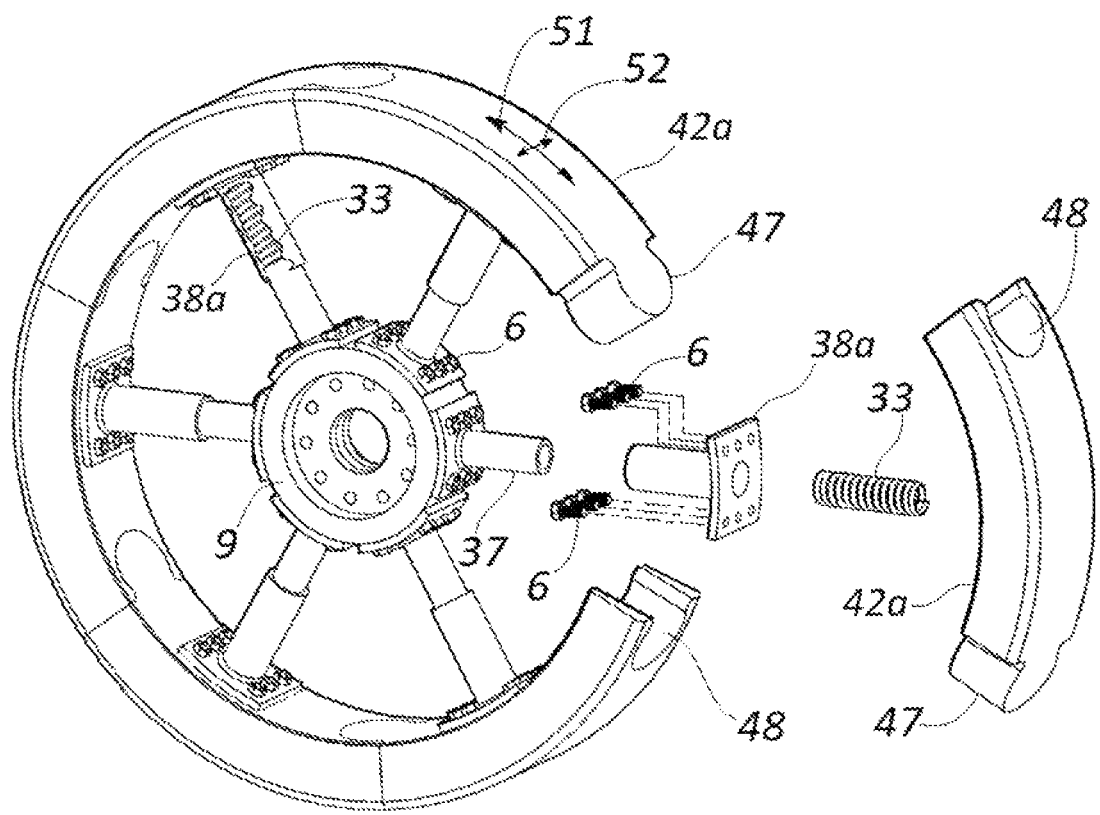
FIG. 14 shows an alternative embodiment of a segmented wheel in accordance with the invention having interlocking rim sections.

FIG. 14 shows an alternative embodiment of a segmented wheel in accordance with the invention having interlocking rim sections. The segmented wheel assembly includes a hub [9] having a plurality of attachment sites for spokes and a plurality of at least two adjacent wheel segments [42a.] The wheel assembly has plurality of spokes each spanning between the hub and any one of the plurality of wheel segments. In this embodiment shown, the spokes are compliant spokes made with concentric tele-scoping tubes. A larger or outer distal spoke element [38a] attached to a wheel segment includes a tube portion that fits around a smaller or inner proximal spoke element [37] that attaches to the hub. In this embodiment the attachments are made using threaded fasteners [6.] A helical spring acts as a compressible element [33] operably connected between the hub and the wheel segment. In one alternative option the spring may be slender enough to extend through both tube sections, or in a preferable configuration, a spring diameter may be selected so as to reside within the tube of the larger spoke element and abut the end of the tube of the smaller spoke element. Another outer spoke element [38a] is shown in a broken view to reveal the compressed spring [33] installed therein as described.

Arrow [51] illustrates an angular direction for features which follows an arc at a constant distance from the rotational axis of the wheel assembly. Arrow [52] defines an axial direction, which is a direction parallel to the rotational axis of the wheel assembly. A radial direction is a direction perpendicular to the rotational axis of the wheel assembly. For example, the tube elements of the spokes extend in a radial direction. With these directions defined, preferably all wheel segments but at least two adjacent wheel segments include interlocking features which extend angularly from their ends. One such or first feature according to the embodiment shown is a protuberance [47] extending in an angular direction, and another such or second feature is an angularly extending cavity [48] complementary to the protuberance of the adjacent wheel segment.

Where the interlocking material of adjacent rim segments, tire segments, or wheel segments is pliable enough so that the segments are separable simply by grappling with them and temporarily deforming the interlocked features to separate the segments for individual replacement, the interlocking features may be closely fitting or even include an interference fit. For more unyielding, rigid, or durable materials, draft angles need to be carefully planned so that any one segment is separable from its adjacent segments.

For the embodiment shown, the wheel segments include an angularly projecting protuberance having a cross section extending in a radial direction, and the angularly extending cavity has a complementary cross section also extending in a radial direction. A detached wheel segment may be disengaged by axial displacement or rotation to free the protuberance from the cavity, and so a minimum practical draft angle for disengageable segments may be found to be at least one half of the angle subtended by the segment. For example, noting that the angular value (in degrees) subtended by wheel segments times the number of segments should equal 360, a wheel built up of six 600 segments would be easily separable if the interlocking features had radial draft angles of at least 30°, and a wheel built up of ten 36° segments would benefit by radial draft angles of at least 18°.

Figure 15A:
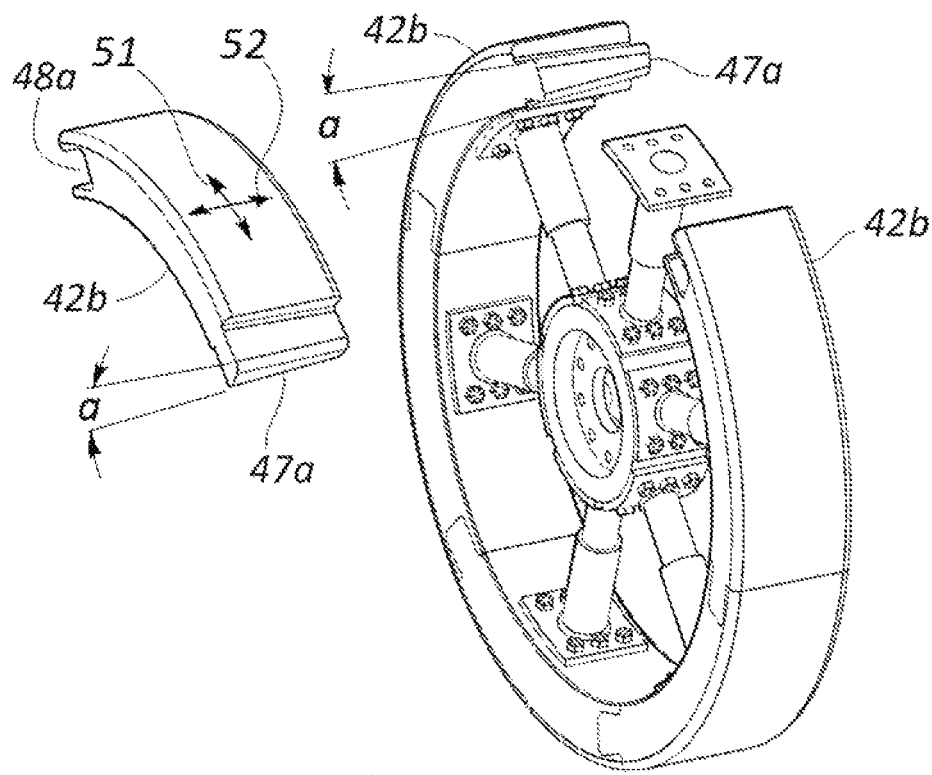
FIG. 15a shows an oblique view of a segmented wheel similar to that of FIG. 14, with one of the segments longitudinally displaced.

FIG. 15a shows an oblique view of a segmented wheel similar to that of FIG. 14, with one of the segments [42b] longitudinally displaced. Arrow [51] defines an angular direction and arrow [52] defines an axial direction. In this embodiment the interlocking features of the wheel segments include an angularly extending protuberance [47a] received by an angularly extending cavity [48a] but in this embodiment the angularly extending protuberance has a cross section extending in an axial direction, and the angularly extending cavity has a complementary cross section extending in an axial direction. These interlocking features may resemble dovetail or mortise and tenon or rabbet and dado interfaces. For axially oriented interlocking features, a wheel segment may be disengaged from the assembly by rotation about an axis extending radially from the hub, preferably such as by having spoke elements [37, 38a of FIG. 14] rotatably coupled to each other so that the spoke assembly defines a pivot axis for disengagement of its wheel segment. Disengagement may be eased by having the complementary interlocking features include draft angles [a] having neutral planes perpendicular to the axis of rotation of the wheel, so that the parts come free of each other after minimal initial displacements during disassembly.

Figure 15B:
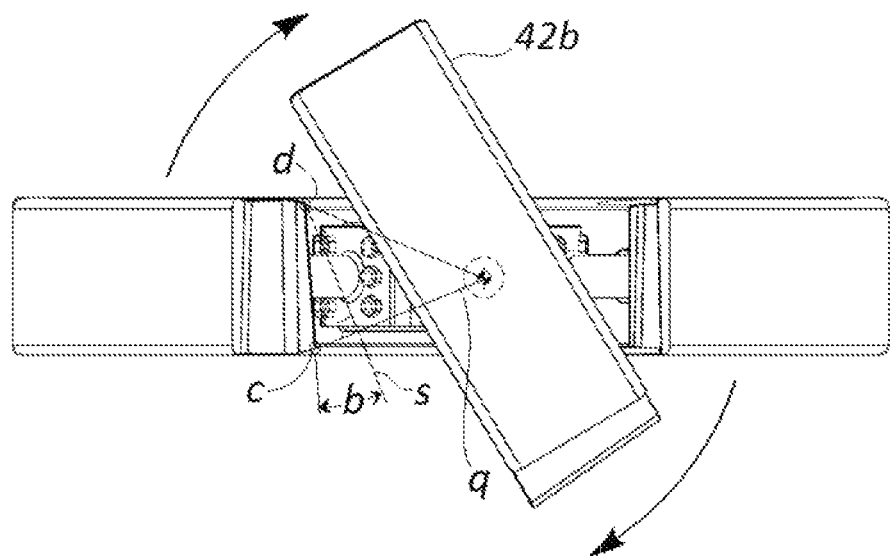
FIG. 15b shows a top view of the segmented wheel of FIG. 14, illustrating a pivoting motion used to disengage the interlocking features of adjacent wheel sections.

FIG. 15b shows a top view of the segmented wheel of FIG. 14, illustrating a pivoting motion used to disengage a wheel segment [42b] from the interlocking features of adjacent wheel sections. For a pivot axis defined by a spoke, a first approximation of an effective draft angle [a of FIG. 15a] to provide relief and release of individual pivotable wheel segments may be estimated by laying out lines from the pivot center to corner points [c] and [d] of a feature to be relieved by a draft angle in its mating feature. For a line [q] extending from the pivot center to feature corner point [c,] an effective draft angle may be estimated as angle [b] subtended between the radial face the feature and a line [s] lain out from the opposite corner [d] and perpendicular to line [q.]

Note that alternative embodiments exist within the scope of the inventions wherein the spoke axis may not necessarily attach to a center of symmetry or a center of gravity of the wheel segments, although in some embodiments either or both of those conditions may be preferable.

Figure 16A:
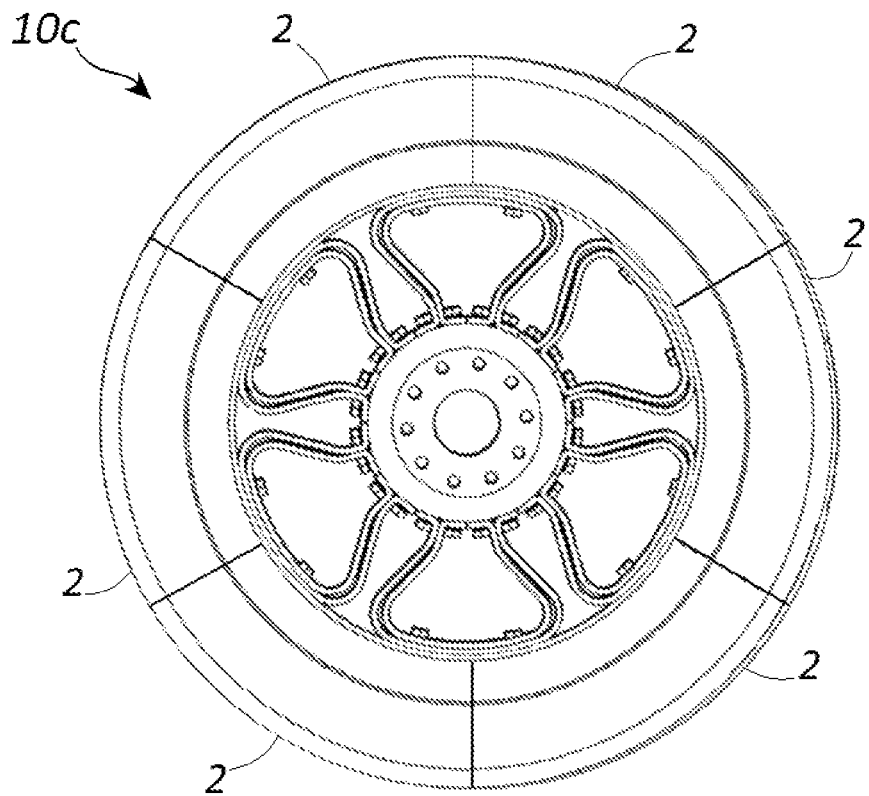
FIG. 16a shows a front view of another alternate embodiment of a segmented wheel assembly having omega spokes which support adjacent wheel segments.

FIG. 16a shows a front view of another alternate embodiment of a segmented wheel assembly [10c] having omega spokes which support adjacent wheel segments [2.] This assembly has a plurality of instances where a single omega spoke supports more than one wheel segment.

Figure 16B:
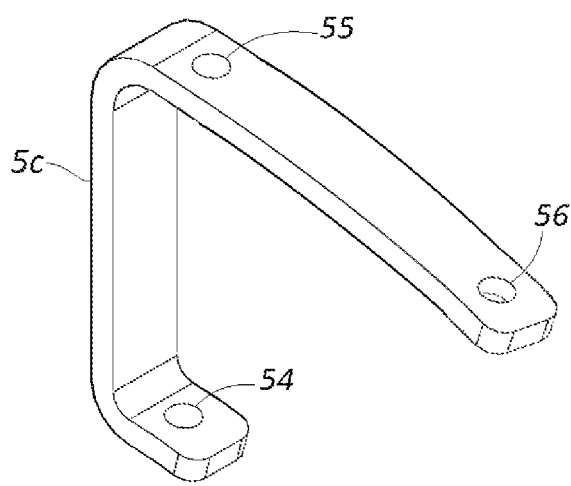
FIG. 16b shows an oblique view of an alternate embodiment of a spoke configured to support adjacent wheel segments.

FIG. 16b shows an oblique view of an alternate embodiment of a spoke [5c] configured to support adjacent wheel segments. This spoke includes an attachment site [54] for securing it to the hub as a first attachment site, a second attachment site [55] for securing the spoke to a first wheel segment and a third attachment [56] for securing it to a second wheel segment.

Figure 17:
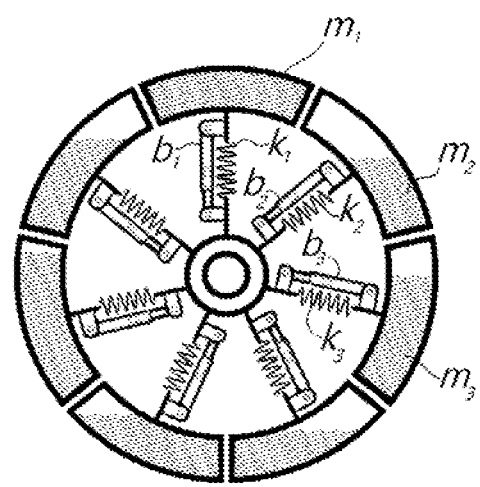
FIG. 17 is a stylized diagram of kinematic elements of a segmented wheel in accordance with the invention.

FIG. 17 is a stylized diagram of kinematic elements of a segmented wheel in accordance with the invention. Each segment may be considered as a spring, mass, and damper system. However, at moderate speeds and above, the problem of coupled vibration may arise if several or all of the segments and their supporting spoke systems have substantially similar resonance frequencies, or have frequencies which are nodal multiples of each of the such as 2:1, 3:2, etc, which may set up harmonic vibrations between one segment and another. A first solution for mitigating this problem is to arrange the wheel segments to have differing resonance frequencies in which no one segment system is the same as or contains harmonics of another. A second modal vibration may occur where the number of spokes in the system is factorable. Thus, wheels having even numbers of spokes and especially highly composite numbers, such as 6 or 12 which have many factors, may establish oscillations between sets of spokes in which the number of segments in each set is a factor of the number of segments in the wheel. A second solution to mitigate this source of coupled vibration is to build a segmented wheel having a prime number of segments. Practical prime numbers of segments include but are not limited to 3, 5, 7, and 11 segments.

A system having seven segments is depicted in the figure. The resonance frequency of each segment is determined by the elasticity of the segment assembly [k,] the mass of the segment [m,] and damping factors [b] provided by mechanical shock absorbers, or by natural damping inherent in the component materials. Pneumatic tire segments commonly inhere both elastic and damping properties. Although it would be possible to provide equalsized tire segments with diverse material components so that they have different masses, for pneumatic tire segments a more economical solution may be to produce tire segments of equal size while varying the quantity or concentration of ballast fluids (such as calcium chloride) inside the tire, so that units of equal size have different masses $[m_1,]$ $[m_2,]$ $[m_3,]$ etc. Similarly, shock absorbers or snubbers may be secured having varying damping factors $[b_1,]$ $[b_2,]$ $[b_3,]$ etc. For gas pressure shocks, just like varying the fluid in the tire segments, the gas composition and pressure may be varied among a set of otherwise identical components as a more economical solution than inventorying and deploying diverse components. For varying the compressive compliance of the spoke assemblies, axial spring rates $[k_1,]$ $[k_2,]$ $[k_3,]$ etc. may be varied by building segments having different numbers of spokes, different nestings of nestable spokes, or collections of spokes having different materials, such as different alloys which vary the elasticity of spokes otherwise formed to the same shape, or different heat treatments, such as "quarterhard," "half-hard," "mill-hard," "spring hard" and other tempering process designations.

While certain features and aspects have been described with respect to exemplary embodiments, one skilled in the art will recognize that numerous modifications are possible. Also, while certain functionality is ascribed to certain system components, unless the context dictates otherwise, this functionality may be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Furthermore, the procedures described with respect to one method or process may be incorporated within other described methods or processes; likewise, system components described according to a particular structural configuration and/or with respect to one system may be organized in alternative structural configurations and/or incorporated within other described systems.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled.

Hence, while various embodiments are described with or without certain features for ease of description and to illustrate exemplary aspects of those embodiments, the various components and/or features described herein with respect to a particular embodiment may be substituted, added, and/or subtracted from among other described embodiments, unless the context dictates otherwise. Thus, unauthorized instances of apparatuses and methods claimed herein are to be considered infringing, no matter where in the world they are advertised, sold, offered for sale, used, possessed, or performed.

Consequently and in summary, although many exemplary embodiments are described above, it will be appreciated that the invention is intended to cover all modifications and equivalents within the scope of the following claims.

What is claimed is:

1. A segmented wheel assembly, comprising:
a rim segment having a radially outward facing surface and further comprising at least one attachment site,
a tire segment bonded to said radially outward facing surface of said rim segment and further comprising a tread pattern,
a hub comprising a plurality of attachment sites,
an omega spoke comprising first and second attachment sites, said spoke attached to said rim segment and said hub, and with said omega spoke further comprising a central arcuate portion disposed between two descending leg portions,
with each descending leg further comprising an end flange, with said first omega spoke in contact with an inner surface of said wheel segment.

2. The segmented wheel assembly of claim 1, wherein said spoke is a first spoke and further comprising a second spoke attached to said rim segment and said hub.

3. The segmented wheel assembly of claim 1, wherein said spoke further comprises a compliant section.

4. The segmented wheel assembly of claim 1, wherein said spoke further comprises a mechanical spring.

5. The segmented wheel assembly of claim 1, wherein said spoke further comprises a compressed fluid.

6. The segmented wheel assembly of claim 1, wherein said tire segment further comprises a first material and a core comprising a second material.

7. The segmented wheel assembly of claim 1, wherein said tire segment further comprises a cavity and a liquid disposed within said cavity.

8. The segmented wheel assembly of claim 1, wherein said spoke further comprises a strip material of varying width.

9. The segmented wheel assembly of claim 1, wherein said rim segment is a first rim segment and said spoke further comprises a third attachment site for attachment to a second rim segment.

10. The segmented wheel assembly of claim 1, wherein the number of segments of the wheel assembly is a prime number.

11. A segmented wheel assembly, comprising
a hub having a first plurality of attachment sites,
a wheel segment comprising a tire tread and a second plurality of threaded apertures, and at least a first omega spoke comprising a central arcuate portion disposed between two descending leg portions,
with each descending leg further comprising an end flange,
with said first omega spoke in contact with an inner surface of said wheel segment.

12. The segmented wheel assembly of claim 11, wherein said wheel segment further comprises a rim segment and a tire segment bonded to said rim segment.

13. The segmented wheel assembly of claim 11, wherein said first omega spoke is a first from among a plurality of omega spokes, and wherein at least one end flange from among said plurality of omega spokes is in contact with said hub.

14. The segmented wheel assembly of claim 11, wherein said end flanges of said descending legs of said first omega spoke are inward facing.

15. The segmented wheel assembly of claim 11, wherein said end flanges of said descending legs of said first omega spoke are outward facing.

16. The segmented wheel assembly of claim 11, further comprising a second omega spoke nested within said first omega spoke.

17. The segmented wheel assembly of claim 11, wherein said rim segment further comprises a radially outward facing surface disposed between two axially inward facing flanges.

18. The segmented wheel assembly of claim 11, wherein said wheel segment is a first wheel segment and said omega spoke is also in contact with a second wheel segment.

19. The segmented wheel assembly of claim 11, wherein the number of segments of the wheel assembly is a prime number.

* * * * *